United States Patent
Malinowski

(10) Patent No.: US 8,756,669 B2
(45) Date of Patent: Jun. 17, 2014

(54) SECURITY MODE FOR MOBILE COMMUNICATIONS DEVICES

(75) Inventor: Richard Malinowski, Lucas, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/528,345

(22) Filed: Jun. 20, 2012

(65) Prior Publication Data

US 2013/0347084 A1 Dec. 26, 2013

(51) Int. Cl.
*H04W 12/08* (2009.01)
*G06F 21/50* (2013.01)
*H04W 12/10* (2009.01)
*G06F 21/31* (2013.01)
*H04L 29/06* (2006.01)
*H04W 84/08* (2009.01)

(52) U.S. Cl.
CPC .............. *G06F 21/50* (2013.01); *H04W 12/08* (2013.01); *H04W 12/10* (2013.01); *G06F 21/31* (2013.01); *H04L 63/08* (2013.01); *H04W 84/08* (2013.01)
USPC ............ 726/6; 726/3; 726/5; 726/26; 726/27; 380/270; 455/410; 455/411

(58) Field of Classification Search
CPC ......... G06F 21/31; G06F 21/50; H04L 63/08; H04W 12/10; H04W 84/08; H04W 4/10
USPC .................. 726/6, 26, 27, 3, 5; 455/410, 411; 380/270
See application file for complete search history.

(56) References Cited

U.S. PATENT DOCUMENTS

| 5,341,498 | A | * | 8/1994 | Connor et al. ........................ 1/1 |
| 6,728,880 | B1 | | 4/2004 | Sites |
| 7,921,303 | B2 | | 4/2011 | Mauro |
| 8,116,737 | B2 | * | 2/2012 | Li et al. ........................ 455/411 |
| 8,275,345 | B2 | * | 9/2012 | Bumiller et al. ........... 455/404.1 |
| 2005/0138409 | A1 | | 6/2005 | Sheriff |
| 2005/0183138 | A1 | * | 8/2005 | Phillips et al. .................. 726/11 |
| 2005/0186954 | A1 | * | 8/2005 | Kenney ........................ 455/420 |
| 2006/0258385 | A1 | * | 11/2006 | Hovestadt ..................... 455/520 |
| 2007/0129012 | A1 | * | 6/2007 | Snow ........................... 455/26.1 |
| 2008/0086545 | A1 | * | 4/2008 | Fatt et al. ...................... 709/220 |
| 2008/0104207 | A1 | * | 5/2008 | Pulkkinen et al. ............ 709/220 |
| 2012/0094636 | A1 | * | 4/2012 | Li et al. ........................ 455/411 |

FOREIGN PATENT DOCUMENTS

CN 101356536 A 1/2009

OTHER PUBLICATIONS

Tablet PC Android 4.0 User's Guide, 34 pages.
International Search Report and Written Opinion received in International Application No. PCT/CN2013/077530 mailed Sep. 26, 2013, 10 pages.

* cited by examiner

*Primary Examiner* — Kambiz Zand
*Assistant Examiner* — Tongoc Tran
(74) *Attorney, Agent, or Firm* — Slater & Matsil, L.L.P.

(57) ABSTRACT

A system and method of implementing a security mode in a mobile communications device, including a mobile communications device comprising a processor, and a computer readable storage medium storing programming for execution by the processor, the programming including instructions to activate a security mode of the mobile communications device, and pursuant to activation of the security mode, disable a first class of features of the mobile communications device, wherein other features of the mobile communications device remain enabled after activation of the mobile security.

21 Claims, 4 Drawing Sheets

SECURITY MODE FOR MOBILE COMMUNICATIONS DEVICES

TECHNICAL FIELD

The present invention relates generally to a security mode for mobile devices.

BACKGROUND

By their very nature, modern mobile devices may create potential security breaches when introduced into secure facilities. For instance, mobile devices may allow users to communicate information (e.g., classified or otherwise) via signals (e.g., cellular, text, email, etc.) to remotely positioned third parties, as well as allow the on-board recordation/storage of information via one or more recordation/storage features, e.g., video/image cameras, voice recorders, scanners, etc. To address this security concern, administrators and/or security personnel may require guests to relinquish their mobile devices at a security check point upon entering the facility. However, this practice may inconvenience guests, as the relinquished mobile devices may contain useful applications or features (e.g., calendars, contact lists, slide shows, etc.) that the guest may wish to access during their visit. As such, a technique or method for reliably and securely disabling a first class of features (e.g., features posing a security threat) of a mobile device, without disabling other features, is desired.

SUMMARY OF THE INVENTION

Technical advantages are generally achieved, by preferred embodiments of the present invention which include a security mode for mobile devices.

In accordance with an embodiment, a mobile communications device for activating a security mode that disables a first class of features of the mobile communications device, wherein at least some features of the mobile communications device remain enabled after activation of the security mode.

In accordance with another embodiment, an apparatus for securing a mobile communications device, the apparatus configured to send a locking signal to activate a security mode of the mobile communications device. In this example, activation of the security mode causes the mobile device to disable video and voice recording features of the mobile communications device without disabling at least some features of the mobile communications device.

In accordance with yet another embodiment, a method of operating a mobile communications device comprising detecting a locking instruction comprising a locking code by the mobile communications device, and pursuant to detecting the locking instruction, activating a security mode of the mobile communications device. In this example, activation of the security mode disables video and voice recording features of the mobile communications device without disabling other features of the mobile communications device.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
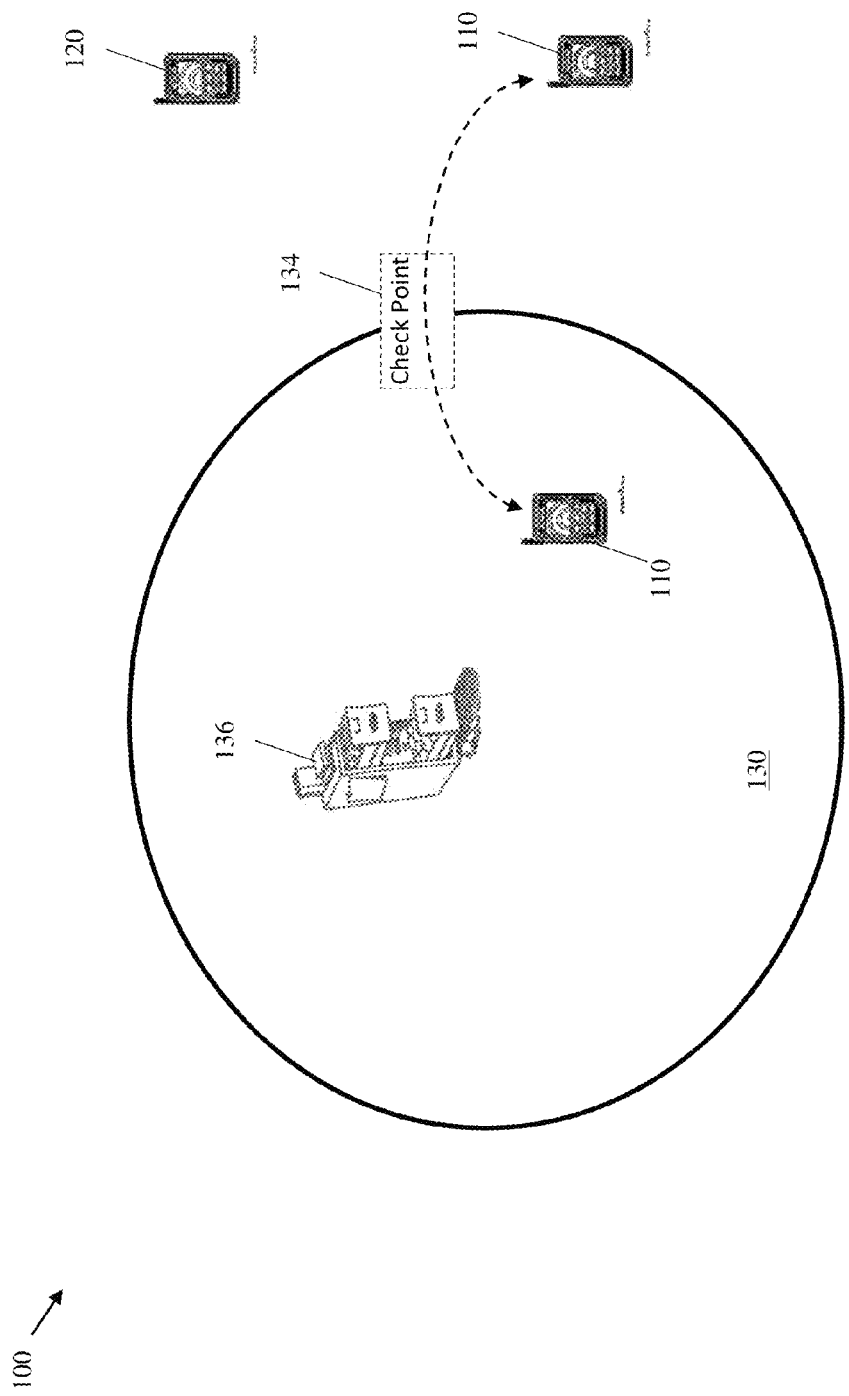
FIG. 1 illustrates a diagram of a secure facility.

FIG. 1 illustrates an embodiment of a secure facility architecture 100. The secure facility architecture 100 comprises a plurality of mobile devices 110, 120, and a secure zone 130. The mobile devices 110, 120 may be any device or collection of components capable of engaging in wireless communication (e.g., cell phones, tablets, laptops, etc.) or otherwise storing data for re-creation and/or re-use outside of the secure zone 130 (e.g., non-wireless devices with recording functions). The secure zone 130 may be any area in which administrators or security personnel wish to limit certain features of a mobile device. For instance, the secure zone 130 may be a government archive, or a private compound housing sensitive or confidential information. The secure zone 130 comprises a check point 134 and data 136. The check point 134 may be a controlled access point that is monitored (e.g., by security personnel or otherwise) to provide restricted access to the secure zone 130. For instance, the check point 134 may include a security terminal that monitors (autonomously or otherwise) an access point. The security terminal performs various security procedures. For instance, a guest may have to present identification, as well as verify whether or not they are carrying a mobile device at the check point 134. The data 136 may include any information, including information that is not intended for public dissemination/distribution (e.g., trade secrets, private health records, financial documents, etc.), or information that is intended for public dissemination/distribution in a controlled fashion (e.g., copyrightable material, etc.).

In an embodiment, a guest carrying a mobile device 110 migrates into the secure zone 130 by passing through the check point 134. At the check point 134, the guest verifies that he is carrying the mobile device 110, and allows security personnel to manually (or autonomously) activate a security mode of the mobile device 110. The security mode may be any component or feature of the mobile device 110 (e.g., hardware, software, or combinations thereof) that allows a class of features to be disabled for a period of time without disabling all features of the device. The security mode also includes tracking functionality (e.g., global positioning system (GPS) software or otherwise) that allows administrators to monitor the mobile device's 110 location as it moves throughout the secure zone 130. After a period of time, the guest carries the mobile device 110 back through the check point and outside of the secure zone 130. At such time, security personnel manually (or autonomously) de-activate the security mode of the mobile device 110, thereby re-enabling the previously disabled features.

A feature may be classified based on whether it is considered to pose a security risk if left enabled. For instance a first class of features may include those features that are considered to pose a security risk if left enabled, while a second class of features may include those features that are not considered to pose a security risk if left enabled. Depending on the embodiment, the first class of features may include voice recorders, video recorders, still-image cameras, voice-call service, internet access, texting, writeable memory, as well as other features that that may facilitate a user's re-creation and/or dissemination of classified data outside of a secure facility. In contrast, the second class of features may include calendars, portable document format (pdf) readers, video players (i.e., without a record feature), read-only memory, and other features that are unrelated to the communication and/or recordation of data by the user.

In some embodiments, the classification of features may be performed by an adminstrator to achieve various security levels as well as various levels of mobile device functionality. For instance, the first class of features may be more inclusive if a desired security level is relatively high (e.g., in the pentagon, or other highly secured area). In contrast, the first class of features may be less inclusive if the desired level of security is moderate or low (and the desired level of mobile device functionality is moderate or high), as might be the case in a media event (e.g., a concert). In some embodiments, the first class of features may include those features used to record video and/or audio, such as cameras and voice recorders. In the same or other embodiments, the first class of features may further include features that are capable of recording large amounts of text, such as scanners, etc. In yet other embodiments, the first class of features may include any features used to record or communicate new data, where new data may be defined (by the administrator) to include any data not previously stored on the mobile communications device and/or independently generated by the mobile communications device for the purpose of tracking/monitoring the mobile communications device (e.g., GPS data is excluded from new data if it is generated to allow administrators to track the mobile device in the secured facility). In some embodiments, new data may be qualified (by the administrator) to exceed a threshold amount of data (e.g., a certain number of bytes of data), such that small amounts of data (e.g., data not exceeding a certain number of bytes) may be stored by guests (e.g., calendar events, phone numbers, etc.). Notably, qualifying the definition of new data in such a manner would still prevent the large scale dissemination of secure information (e.g., as might be the result of scanning/recording classified information).

The first class of communicative features may (or may not) include features that allow a user to send/receive data over a cellular or non-cellular link. For instance, an embodiment may include all cellular communications within the first class of features. Another embodiment may exclude data receptions from the first class of features, thereby allowing a user to store data received over a cellular link (e.g., text messages, etc.). Various other features may be specifically excluded from (or included in) the class of communicative features by an adminstrator. For instance, a user may be permitted to make a calendar entry, but may be prohibited from opening a writeable word processing application, as the latter may pose a comparatively higher security threat than the former.

In some embodiments, the first class of features may be specifically targeted at a specific type of dissemination (e.g., mass storage/transfer, etc.). For instance, in an entertainment venue (e.g., a concert, movie theater, etc.), administrators may want to prevent the use of recording devices (video/audio recorders, etc.) that are capable of storing copyrightable material, while still allowing their guests to communicate with one another (e.g., text, voice, etc.). In such embodiments, the first class of features may include only those features that allow the user to copy/record a certain type of media.

In some embodiments, the first class of features may include any feature that allows a user to write data to removable and/or external memory devices (e.g. flash memory cards, secure digital high capacity (SDHC) cards, etc.). In some embodiments, the security mode may include a hash algorithm feature, e.g., message digest five (MD5), secure hash algorithm-1 (SHA-1) or some other feature to prevent large amounts of stored data from being altered. For instance, a user may attempt to game the system by entering large amounts of false contact information prior to entering the secure facility, and subsequently replacing said information with secure information. The hash feature (e.g., MD5 or SHA-1) may create a signature of the stored data upon activation of the security mode for comparison upon de-activation. Accordingly, security personnel may be alerted in the event that the comparison indicated large discrepancies between the data stored upon activation and deactivation (respectively). Alternatively or additionally, the security mode may include a feature which stores all new or modified data in a special file, which could be analyzed upon exiting the secure facility.

Figure 2:
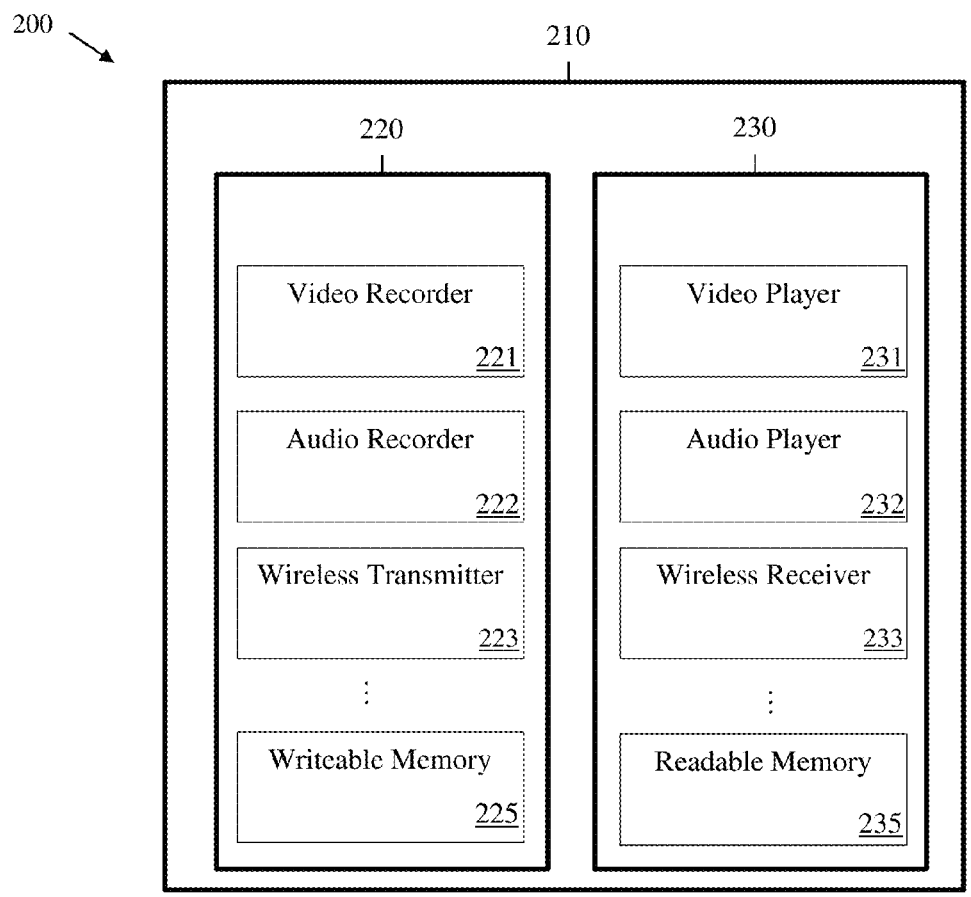
FIG. 2 illustrates a block diagram of an embodiment of a mobile device.

FIG. 2 illustrates a block diagram of an embodiment of a mobile device 200. The mobile device 200 comprises a collection of features 210, which may be implemented in software, hardware, or combinations thereof. The collections of features include a first class of features 220 and a second class of features 230. As discussed above, the classification of features varies based on the desired security level and/or desired mobile device functionality. In some embodiments, the first class of features 220 may include a video recorder 221, an audio recorder 222, a wireless transmitter 223, and a writeable memory 225. In the same or other embodiments, the second class of features 230 may include a video player 231, and audio player 232, a wireless receiver 233, and a readable memory 235. When operating in the security mode, a user of the mobile device 200 can access set of enabled features 230, but cannot access the set of disabled features 220. In an embodiment, a small portion of writeable memory is partitioned off and enabled such that certain kinds of data (e.g., text message received over the wireless receiver 223, calendar entries, etc.) can be stored and/or accessed by the user while the mobile device 200 is operating under the security mode.

Figure 3:
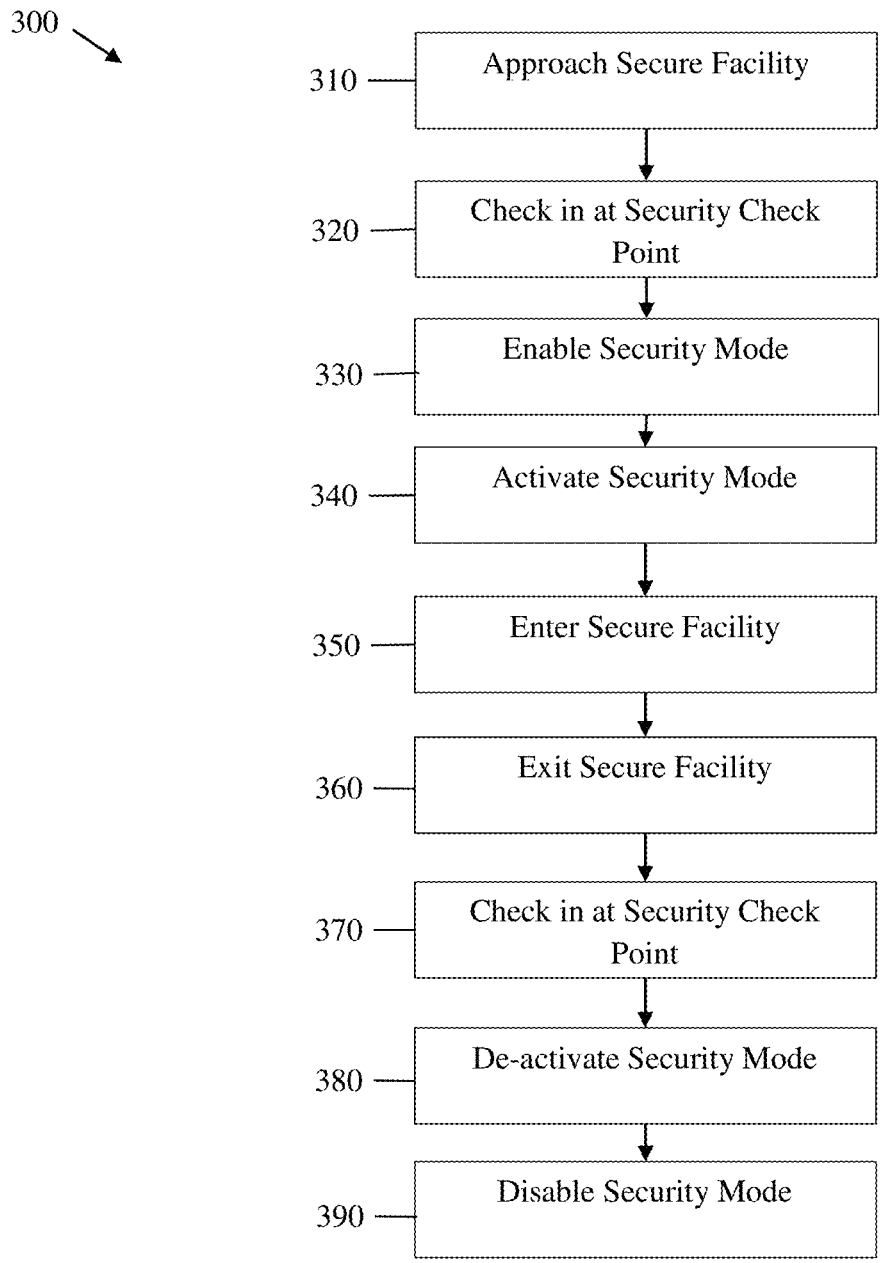
FIG. 3 illustrates a flow chart of an embodiment of a method for implementing a security mode of a mobile device.

FIG. 3 illustrates an embodiment of a method 300 for securing a mobile device of a guest in a secure facility. The method 300 begins at step 310, where the mobile device approaches the secure facility. Next, the method 300 proceeds to step 320, where the mobile device checks in at a security check point.

In some embodiments, the security mode feature may be capable of being enabled/disabled (i.e., in addition to being activated/de-activated) for the purpose of preventing an accidental or unintentional loss of communicative ability. For instance, if the security mode feature is left enabled, then it may be activated unintentionally (or maliciously) by a third party. This may be inconvenient for the user, who may have no way of de-activating the mobile security feature (e.g., short of sending it in for service) without the unlock code. Hence, during normal operation of the device, a user may leave the security mode feature disabled, thereby preventing an unintentional (or malicious) activation of the security mode feature by a third party. Accordingly, the method 300 may (optionally) include a step 330, where a user or security personnel may enable the security mode feature (or otherwise verify that the security mode is enabled). In other embodiments, the enabling/disabling feature may be unnecessary or undesired, and the security mode may always be enabled on the mobile device (i.e., incapable of being disabled). For instance, if activation of the security mode requires client-authorization (affirmative, or otherwise), then disabling the security mode may be unnecessary to prevent accidental or unauthorized activation of the security mode (as activation may require client approval). Such may be the case when an activation of the security mode includes using a client-authorized transport layer security (TLS) handshake procedure to supply the encrypted locking or unlocking PIN code. The TLS handshake (or other similar procedures) may ensure that only secure facilities are capable of activating the security mode.

The method 300 then proceeds to step 340, where the mobile device is prompted to activate a security mode of the mobile device. Activation of the security mode may be accomplished in various ways. In some embodiments, security personnel can manually activate the security mode using a 'star code' and randomly generated PIN-code, e.g. *37*PIN-code#, entered via a keypad or other operating mechanism of the mobile device. In other embodiments, the mobile device is prompted using a locking instruction that is transmitted wirelessly from a check point terminal. In an embodiment, the locking instruction may be transmitted or initiated using an over the air (OTA) protocol. In other embodiments, the locking instruction procedures utilize Bluetooth or Wi-Fi protocols, and incorporate one or more layers of encryption. For instance, communications between the check point terminal and the mobile device uses a Bluetooth protocol incorporating Security Manager Protocol (SMP) to achieve an advanced encryption standard (AES) encryption, e.g., such as AES-128. Alternatively, communications between the check point terminal and the mobile device use a Wi-Fi protocol that incorporates AES encryption using a 64 character encryption key and/or Hypertext Transfer Protocol Secure (HTTPS).

After activating the security mode, the method proceeds to step 350, where the guest enters the secure facility with the security mode activated on the mobile device. An additional feature of the security mode may be a tracking feature, which allows security personnel to monitor the mobile device's location as it moves throughout the secure facility. The tracking feature includes establishing a Wi-Fi connection between the mobile device and a terminal operated by security personnel. In an embodiment, the tracking feature periodically (e.g., every 30 seconds) sends an encrypted signal specifying the mobile device's GPS position or WiFi Cell location over the Wi-Fi connection, which may be established using AES encryption and/or HTTPS.

The guest exits the secure facility at step 360, at which time the guest checks in at the security check point at step 370. Notably, there may be numerous security check points in the secure facility, and the guest may exit through a different check point than that in which he entered. Upon (or shortly after) checking in at the security check point, security personnel deactivate the security mode at step 380 security mode, thereby re-enabling the the set of disabled features. In some embodiments, the security mode may be disabled at step 390, which may (optionally) be included as part of the method 300.

In some embodiments, de-activating the security mode comprises entering an unlocking pin. The unlocking pin may comprise a random pin that is generated when the mobile device enters the facility. It may be stored in an encrypted file on the mobile device upon activation, but may not otherwise be available to the user of the mobile device until exiting the secure facility or secure zone. In some embodiments, storing the unlocking pin in an encrypted file on the mobile device may be necessary so that subsequent verification of the unlocking pin can be performed. In other embodiments, it may be unnecessary. In some embodiments, the security mode includes an alarm feature to alert security personnel of a potential security breach (or an attempted security breach). For instance, the alarm mode may be triggered by a specific number of unsuccessful unlock code attempts (e.g., three failed attempts), and may alert security personnel using an audible noise (e.g., a siren that cycles on and off) or a message sent via a Bluetooth or Wi-Fi connection. If the alarm feature is a siren, it may periodically cycle on and off (e.g., five minutes on, two minutes off), and may be de-activated through entry of a correct pin code or, alternatively, through some de-activation procedure performed by security personnel, e.g., entry of a master code, etc.

Figure 4:
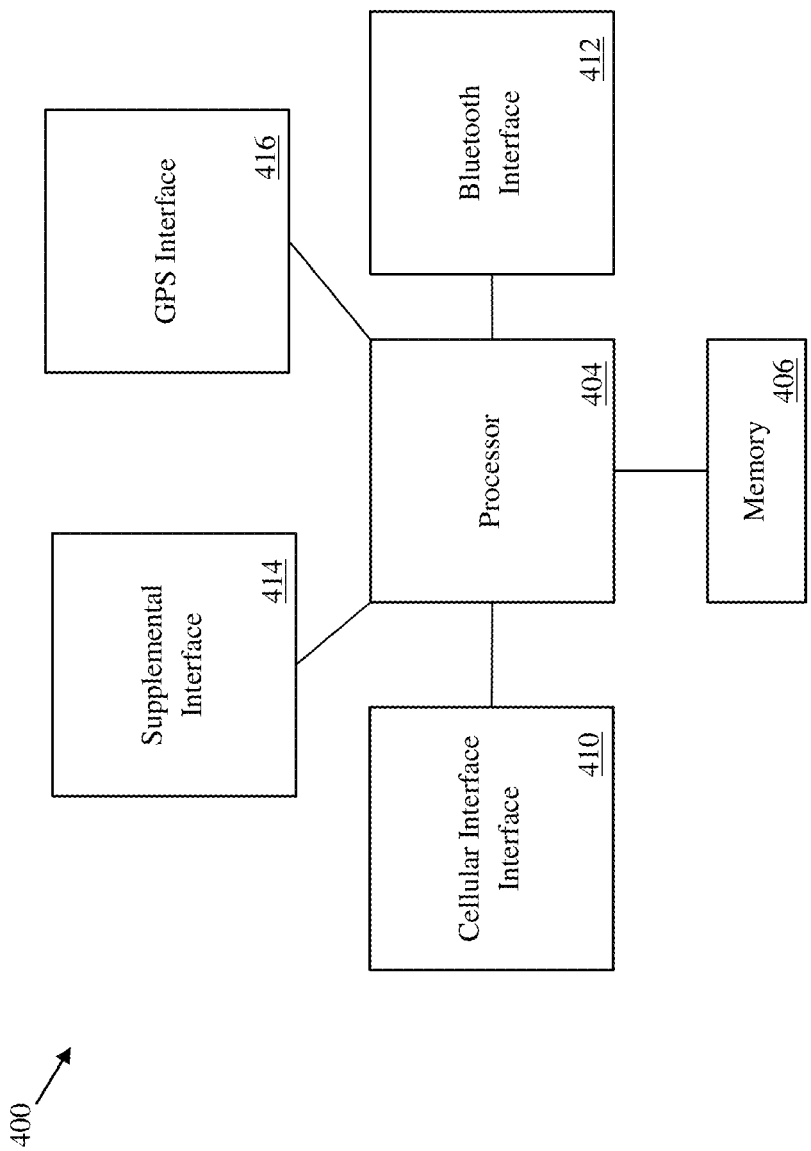
FIG. 4 illustrates a block diagram of another embodiment of a mobile device.

FIG. 4 illustrates a block diagram of an embodiment of a mobile device 400. The mobile device 400 may include a processor 404, a memory 406, a cellular interface 410, a Bluetooth interface 412, a supplemental interface 414, and a GPS interface 416, which may be arranged as shown in FIG. 4, or otherwise. The processor 404 may be any component capable of performing computations and/or other processing related tasks, and the memory 406 may be any component capable of storing programming and/or instructions for the processor 404. The cellular interface 410 may be any component or collection of components that allows the mobile device 400 to communicate using a cellular signal, and may be used to receive and/or transmit information over a cellular network. The Bluetooth interface 412 may be any component or collection of components that allows the mobile device 400 to communicate using a Bluetooth protocol, and may be used to communicate with security personnel, e.g., when activating the security mode, providing proximity information, etc. The supplemental interface 414 may be any component or collection of components that allows the mobile device 400 to communicate via a supplemental protocol, such as a Wi-Fi protocol. The supplementary interface 414 may be used for various administrative and/or other functions. The GPS interface 416 may be used to receive GPS information.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A mobile communications device comprising:
a processor; and
a computer readable storage medium storing programming for execution by the processor, the programming including instructions to:
activate a security mode of the mobile communications device;
pursuant to activation of the security mode, disable a first class of features of the mobile communications device, the first class of features including video and voice recording features, cellular transmission features, and features that facilitate storing or communicating new data by the mobile communications device, wherein new data is defined as any information that is neither stored on the mobile communications device prior to activation of the security mode nor independently generated by the communications device to enable tracking of the mobile communications device, and
wherein at least some features of the mobile communications device remain enabled after activation of the security mode;
determine whether data stored on the mobile communications device has been altered since activation of the security mode; and
deactivate the security mode of the mobile communications device when the data stored on the mobile communications device has not been altered since activation of the security mode.

2. The mobile communications device of claim 1, wherein the instructions to activate the security mode include instructions to activate a global positioning system (GPS) feature for monitoring a position of the mobile communications device.

3. The mobile communications device of claim 1, wherein the instructions to activate the security mode include instructions to establish a non-cellular connection for wirelessly exchanging encrypted communications with a security terminal, and wherein the non-cellular connection is a wireless fidelity (WiFi) or Bluetooth connection.

4. The mobile communications device of claim 1, wherein the programming further includes instructions to enable the security mode prior to activating the security mode.

5. The mobile communications device of claim 1, wherein the programming further includes instructions to:
detect an unlocking pin code; and
determine whether the unlocking pin code is correct based on information associated with a locking pin code received upon activation of the security mode.

6. The mobile communications device of claim 5, wherein the programming further includes instructions to:
de-activate the security mode upon determining that the unlocking pin code is correct, wherein de-activating the mobility security mode re-enables the first class of features of the mobile communications device; and
disable the security mode feature.

7. The mobile communications device of claim 5, wherein the programming further includes instructions to:
activate an alert mode upon determining that a specified number of incorrect unlocking pin codes have been entered, each entry of an incorrect locking code constituting an attempt to de-activate the security mode; and
perform an alert function to alert security personal of a potential security breach.

8. The mobile communications device of claim 7, wherein the alert function is an audible alarm or noise that is emitted continuously, or in periodic intervals, until a correct unlocking pin code is entered.

9. The mobile communications device of claim 7, wherein the alert function is a wireless signal sent to a security checkpoint or control station audible alarm to alert security personal about the potential of an attempted security breach.

10. An apparatus for securing a mobile communications device, the apparatus comprising:
a processor; and
a computer readable storage medium storing programming for execution by the processor, the programming including instructions to:
send a wireless locking signal to a mobile communications device via a non-cellular channel, wherein the locking signal activates a security mode of the mobile communications device, the security mode disabling a first class of features of the mobile communications device without disabling at least some other features of the mobile communications device, the first class of features including video and voice recording features of the mobile communications device, cellular transmission features, and features that facilitate storing or communicating new data by the mobile communications device, and wherein new data is defined as any information that is neither stored on the mobile communications device prior to activation of the security mode nor independently generated by the communications device to enable tracking of the mobile communications device;
determine whether data stored on the mobile communications device has been altered since activation of the security mode; and
deactivate the security mode of the mobile communications device when the data stored on the mobile communications device has not been altered since activation of the security mode.

11. The apparatus of claim 10, wherein the first class of features include all features that are considered to pose a security threat if left enabled.

12. The apparatus of claim 10, wherein the programming further includes instructions to:
monitor the location of the mobile communications device as the mobile communications device moves throughout a secured facility, the monitoring established by receiving global positioning system (GPS) information via a secure wireless fidelity (Wi-Fi) connection, the secure Wi-Fi connection being established upon activation of the security mode.

13. The apparatus of claim 10, wherein the programming further includes instructions to:
send an unlocking signal to de-activate the security mode of the mobile communications device, wherein de-activating the security mode re-enables the first class of features of the mobile communications device.

14. The apparatus of claim 10, wherein the non-cellular channel is a wireless fidelity (WiFi) or Bluetooth channel.

15. A method of operating a mobile communications device, the method comprising:
detecting a wireless locking instruction comprising a locking code by the mobile communications device, the wireless locking instruction being communicated over a non-cellular communications channel;
pursuant to detecting the wireless locking instruction, activating a security mode of the mobile communications device, wherein activating the security mode comprises disabling a first class of features of the mobile communications device without disabling other features of the mobile communications device, the first class of features including video and voice recording features of the mobile communications device, cellular transmission features, and features that facilitate storing or communicating new data by the mobile communications device, and wherein new data is defined as any information that is neither stored on the mobile communications device prior to activation of the security mode nor independently generated by the communications device to enable tracking of the mobile communications device;

determining whether data stored on the mobile communications device has been altered since activation of the security mode; and deactivating the security mode of the mobile communications device when data stored on the mobile communications device has not been altered since activation of the security mode.

16. The method of claim 15 further comprising:

detecting an unlocking pin code;

determining that the unlocking pin code is valid, wherein a valid unlocking code is required to de-activate the security mode; and de-activating the security mode, thereby re-enabling the first class of features.

17. The method of claim 16 further comprising:

verifying that the security mode is enabled prior to activating the security mode; and disabling the security mode after de-activating the security mode.

18. The method of claim 15, wherein activating the security mode comprises:

randomly generating an encrypted pin code;

establishing a secure communications connection with the mobile communications device via a transport layer/secure socket layer security (TLS/SSL) handshake procedure; and sending an encrypted pin code over the secure communications connection, where the encrypted pin code is stored on the mobile communications device and is used to verify an unlocking pin code upon de-activation of the security mode.

19. The method of claim 15, wherein the non-cellular communications channel is a wireless fidelity (WiFi) or Bluetooth channel.

20. The method of claim 15, wherein activating the security mode of the mobile communications device further comprises generating a first stored data signature by applying a hash algorithm to information stored on the mobile communications device when the security mode is activated, and wherein determining whether the data stored on the mobile communications device has been altered since activation of the security mode comprises generating a second stored data signature by applying the hash algorithm to information stored on the mobile communications device, and comparing the second stored data signature with the first stored data signature to determine whether data stored on the mobile communications device has been altered since activation of the security mode.

21. The mobile communications device of claim 1, wherein the instructions to activate the security mode of the mobile communications device further include instructions to generate a first stored data signature by applying a hash algorithm to information stored on the mobile communications device when the security mode is activated, and wherein the instructions to determine whether the data stored on the mobile communications device has been altered since activation of the security mode include instructions to generate a second stored data signature by applying the hash algorithm to information stored on the mobile communications device, and to compare the second stored data signature with the first stored data signature to determine whether data stored on the mobile communications device has been altered since activation of the security mode.

* * * * *

UNITED STATES PATENT AND TRADEMARK OFFICE
CERTIFICATE OF CORRECTION

PATENT NO.        : 8,756,669 B2                                  Page 1 of 1
APPLICATION NO.   : 13/528345
DATED             : June 17, 2014
INVENTOR(S)       : Richard Malinowski It is certified that error appears in the above-identified patent and that said Letters Patent is hereby corrected as shown below:

In the Claims:

In Col. 7, line 59, claim 6, immediately after "mode" delete "feature".

Signed and Sealed this
Twenty-third Day of September, 2014

Michelle K. Lee
*Deputy Director of the United States Patent and Trademark Office*